United States Patent [19]

Tabuchi

[11] Patent Number: 5,893,122
[45] Date of Patent: Apr. 6, 1999

[54] HYPER-MEDIA SYSTEM INCLUDING PLURAL APPLICATION PROCESSORS WHICH EXECUTE NAVIGATION PROCESSING FOR HYPER-MEDIA DOCUMENT

[75] Inventor: Masahiro Tabuchi, Tokyo, Japan

[73] Assignee: NEC Corporation, Tokyo, Japan

[21] Appl. No.: 757,595

[22] Filed: Nov. 29, 1996

[30] Foreign Application Priority Data

Nov. 29, 1995 [JP] Japan ................................. 7-334169

[51] Int. Cl.⁶ .................................................. G06F 13/00
[52] U.S. Cl. ................................. 707/501; 707/513
[58] Field of Search .................................. 707/103, 104, 707/501, 513, 514, 9; 395/200.36, 200.53, 200.68

[56] References Cited

U.S. PATENT DOCUMENTS

| | | | |
|---|---|---|---|
| 5,367,621 | 11/1994 | Cohen et al. | 707/501 |
| 5,446,891 | 8/1995 | Kaplan et al. | 707/2 |
| 5,634,062 | 5/1997 | Shimizu et al. | 707/501 |
| 5,678,041 | 10/1997 | Baker et al. | 707/9 |
| 5,694,594 | 12/1997 | Chang | 707/6 |
| 5,706,507 | 1/1998 | Schloss | 707/104 |
| 5,708,780 | 1/1998 | Levergood et al. | 395/200.59 |
| 5,717,917 | 2/1998 | Munakata | 370/431 |

FOREIGN PATENT DOCUMENTS

| | | |
|---|---|---|
| 1-293433 | 11/1989 | Japan . |
| 3-34067 | 2/1991 | Japan . |
| 4-14177 | 1/1992 | Japan . |
| 5-128157 | 5/1993 | Japan . |
| 5-181736 | 7/1993 | Japan . |
| 6-28355 | 2/1994 | Japan . |

OTHER PUBLICATIONS

Developer Press, "Open Doc Programmer's Guide" for the Macintosh, Chapter 3, pp. 77–102, 1995.

*Primary Examiner*—Stephen S. Hong
*Attorney, Agent, or Firm*—Foley & Lardner

[57] ABSTRACT

A hyper-media system includes a storage device for storing a hyper-media document. The system includes a plurality of application processing units (APU) for conducting individualized processing in reference to the hyper-media document in accordance with the individual program of the APUs. A common processing unit is also provided for conducting and managing the processing of common attributes of the hyper-media document, which attributes are common among all of the processing performed by the APUs. A procedure management unit allocates various kinds of procedures for the hyper-media document to the common processing unit and the APUs. Both the common processing unit and each of the plural APUs include navigation processing which includes the functions of node management, link management and navigation management execution. Navigation processing specific to individual APUs thus provides enhanced flexibility in processing and in permitting use of the contents of one APU by another APU.

9 Claims, 8 Drawing Sheets

HYPER-MEDIA SYSTEM INCLUDING PLURAL APPLICATION PROCESSORS WHICH EXECUTE NAVIGATION PROCESSING FOR HYPER-MEDIA DOCUMENT

BACKGROUND OF THE INVENTION

1. Field of the Invention

The present invention relates to a hyper-media system which enables one hyper-media document to be used by a plurality of application processing units in different modes, as well as allowing flexible navigation processing for a hyper-media document.

2. Description of the Related Art

Figure 8:
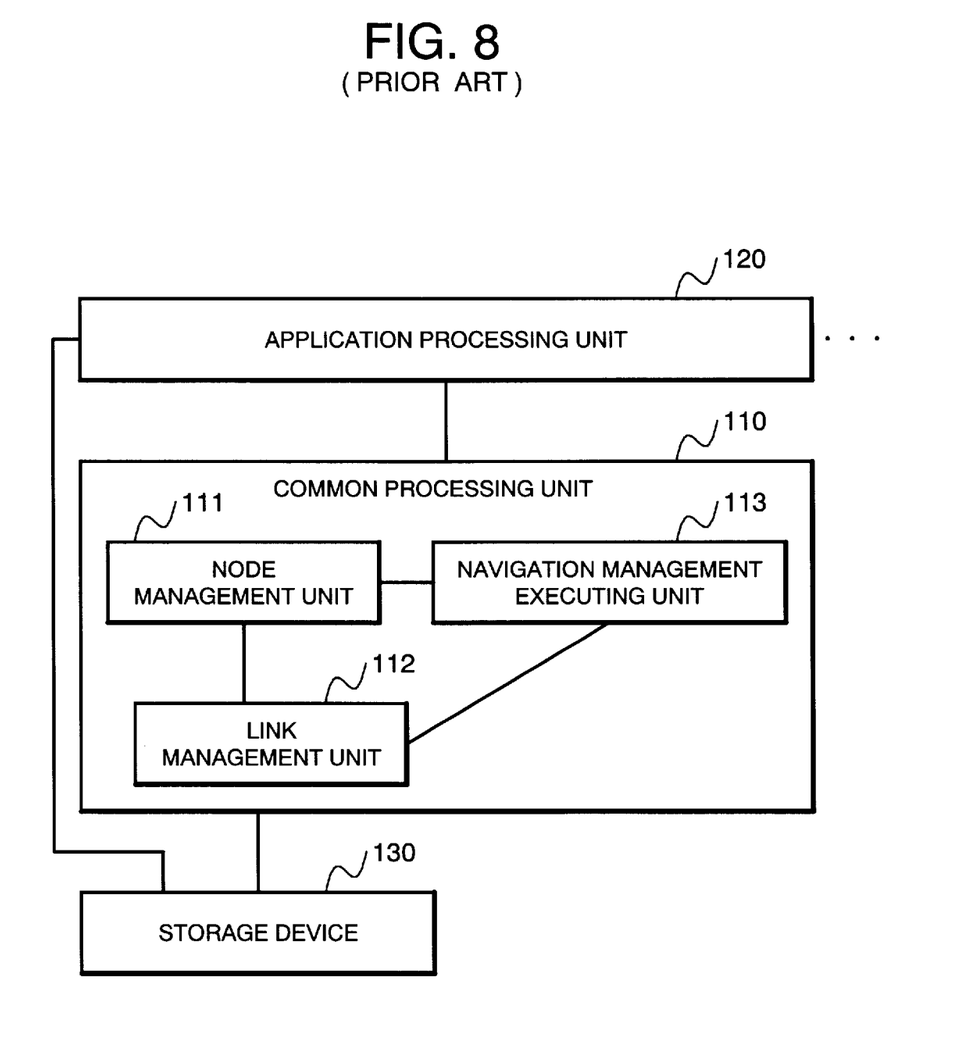
FIG. 8 is a block diagram showing structure of a conventional hyper-media system.

Hyper-media systems deal with various kinds of data such as image data including motion picture and still picture, text data, and voice data. Such systems are implemented with hyper-media architecture provided with a function of executing navigation processing for tracing links between nodes with respect to a hyper-media document. FIG. 8 shows structure of a conventional hyper-media system. As illustrated in FIG. 8, the conventional hyper-media system includes a common processing unit 110 for conducting management and processing of common attributes in a hyper-media document, an application processing unit 120 for conducting inherent processing with respect to a hyper-media document and a storage device 130 for storing a hyper-media document.

The common processing unit 110 includes a node management unit 111, a link management unit 112 and a navigation management unit 113. The node management unit 111 has a function of registering, searching for and deleting various kinds of data including image, text and voice as nodes in the hyper-media architecture. The link management unit 112 has a function of creating a link between two nodes by using a node identifier obtained through the node management unit 111 and registering, searching for and deleting the link. The navigation management executing unit 113 manages a node identifier of a node being referred to by a user and has a function of controlling the node management unit 111 to read appropriate nodes and controlling the link management unit 112 to read a link to be traced in response to an instruction given by a user. The navigation management executing unit 113 has a further function of obtaining node data from the node management unit 111 based on a node identifier of the node to which the link is traced and presenting the obtained node data to a user.

A plurality of the application processing units 120 exists in the hyper-media system, each being formed by an API (Application Programming Interface) for calling the function of the common processing unit 110. Each application processing unit defines the type of data to be stored as a node or a link and stores a hyper-media document in the storage device 130 through the node management unit 111 and the link management unit 112 of the common processing unit 110. With the selection of a node by a user with respect to a read hyper-media document, the application processing unit notifies the navigation management executing unit 113 in the common processing unit 110 of the selection of the node to obtain and output node data of a node to which the link is to be traced.

Navigation processing by the navigation management executing unit 113 such as tracking of a link between nodes is mainly conducted by reading a hyper-media document in which a link whose semantic attribute is set in advance is described and executing a procedure correlated to the semantic attribute of the link.

Figure 9:
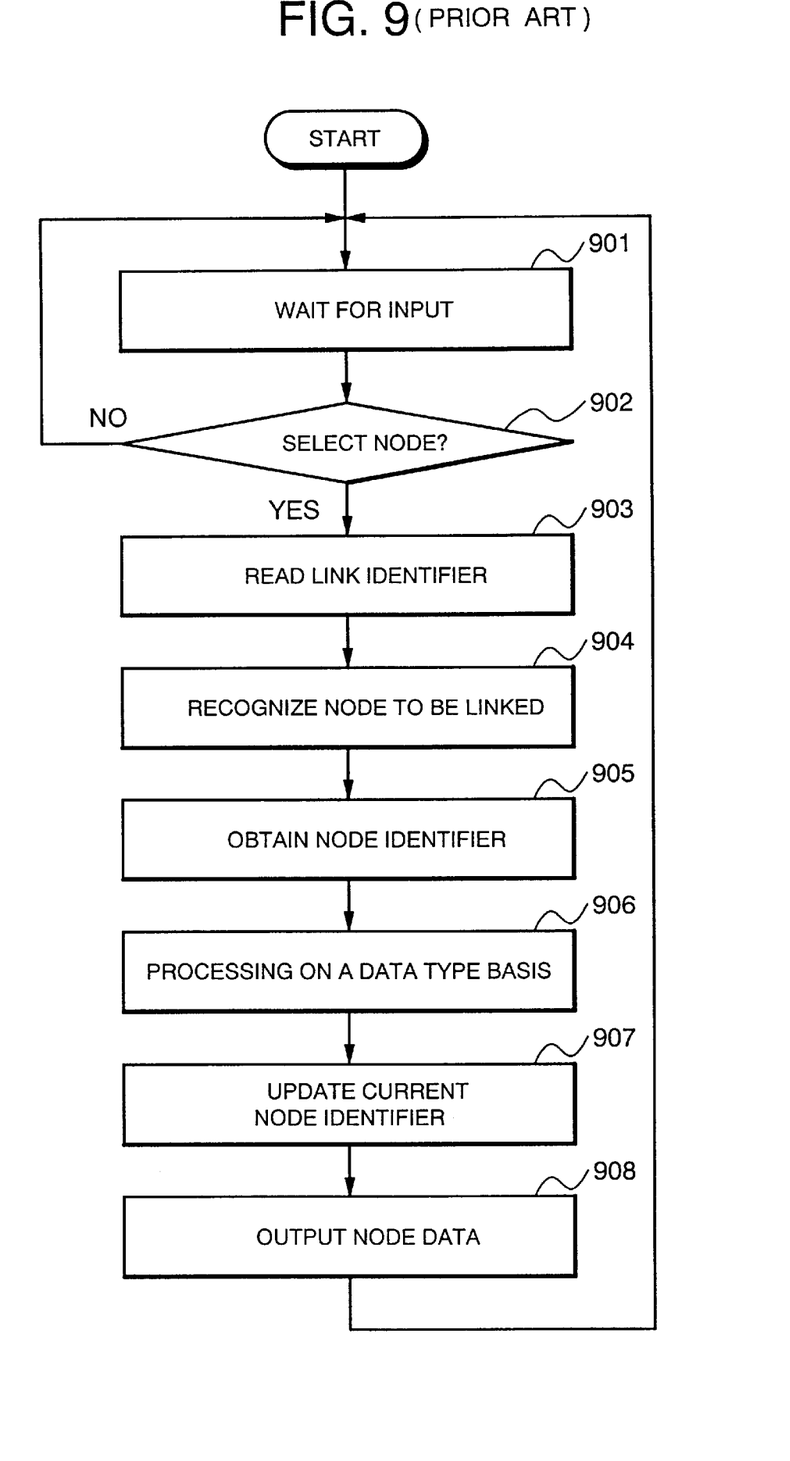
FIG. 9 is a flow chart showing navigation processing by a conventional hyper-media system.

FIG. 9 is a flow chart showing a conventional navigation processing of this kind. With reference to the figure, upon designation of a part defined as a node in the hyper-media document by the operation such as mouse click (Steps 901, 902), a link identifier correlated with the designated part is obtained by the link management unit 112 (Step 903). Then, a node identifier of a node to be linked with the link specified by the link identifier is obtained by the node management unit 111 (Steps 904, 905). Conducted thereafter are processing for referring to other part of the hyper-media document, that is, individual processing according to a type of data, updating of a node identifier being referred to (node identifier of a current node), and output of node data of a new current node (Steps 906–908).

Thus, the conventional hyper-media system executes navigation processing correlated with a predetermined semantic attribute (inherent semantic attribute) of a link.

Hyper-media document navigation processing by the above-described conventional hyper-media system, however, has a drawback that the processing lacks facility because semantic attributes correlated with a link are so fixed that one hyper-media document can not be used by a plurality of application processing units in different modes.

In addition, since application processing units constituting a conventional hyper-media system is each provided with no function of controlling navigation processing (function implemented by node management means, link management means and navigation management executing means) and counterpart functions of the common processing units are limited, it is impossible to conduct navigation processing coping with flexible processing such as processing inherent to each application processing unit and use of contents of one application processing unit by other application processing unit.

SUMMARY OF THE INVENTION

The present invention provides a hyper-media system capable of, through the introduction of the concept of context, altering the operation of navigation processing by switching context data described in a hyper-media document.

The invention provides a hyper-media system with high flexibility which enables the same hyper-media document to be used by a plurality of application processing units in different modes.

The invention provides a hyper-media system capable of conducting navigation processing dealing with flexible processing such as processing inherent to each application processing unit and use of the processing contents of a certain application processing unit by other application processing unit.

The invention provides a hyper-media system which enables alteration of operation in navigation processing without changing program codes for implementing an application processing unit or editing a hyper-media document, thereby reducing time required for changing the operation of the navigation processing.

According to one aspect of the invention, a hyper-media system which executes navigation processing for tracing a link between nodes in a hyper-media document, comprises storage means for storing a hyper-media document;

application processing means for conducting inherent processing by using said hyper-media document;

common processing means for conducting management and processing of common attributes in said hyper-media document; and procedure management means for allocating various kinds of procedures for said hyper-media document to said common processing means and said application processing means and managing the procedures.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
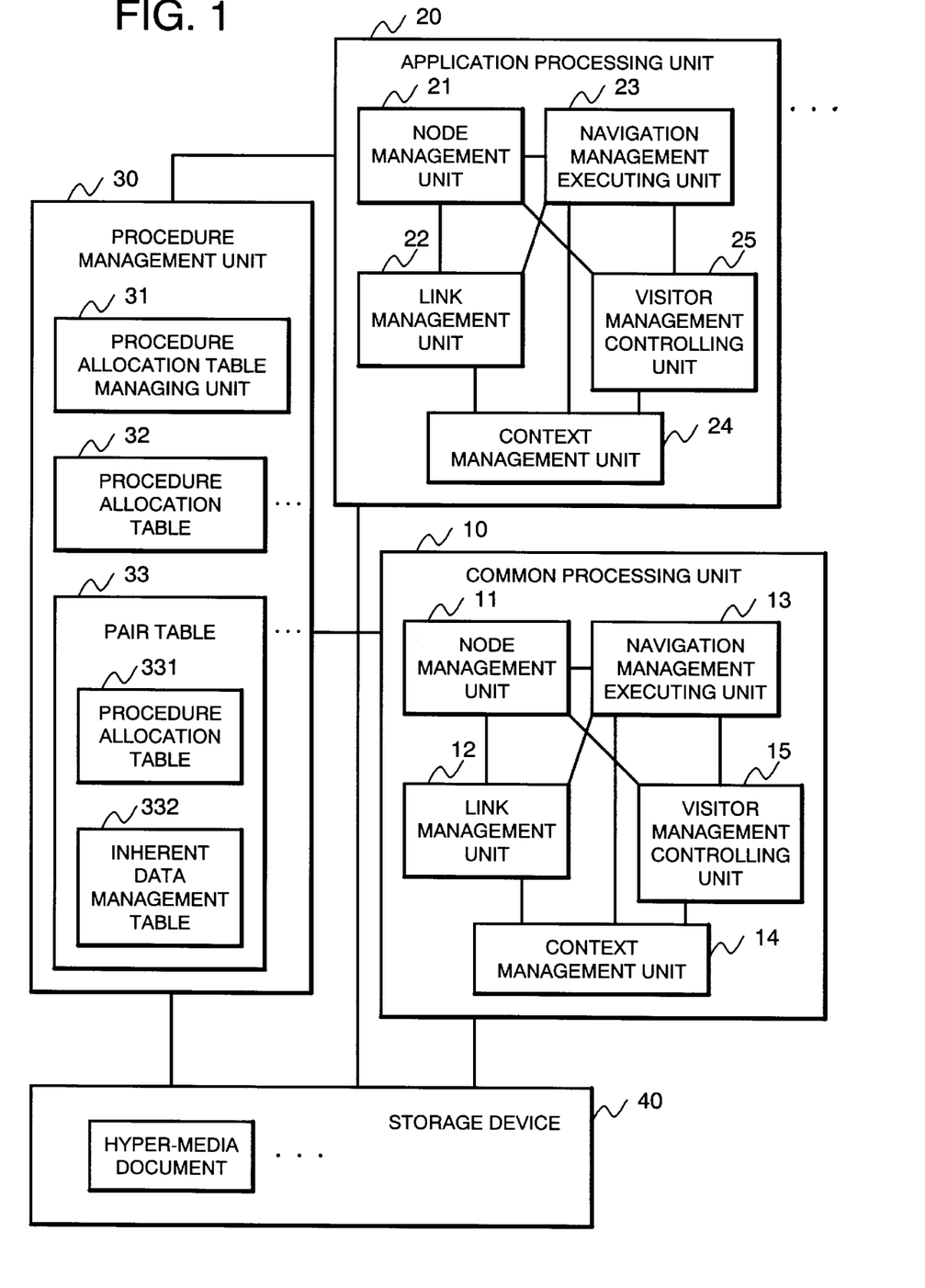
FIG. 1 is a block diagram showing structure of a hyper-media system according to one embodiment of the present invention.

FIG. 1 is a block diagram showing structure of a hyper-media system according to one embodiment of the present invention.

As illustrated in the figure, the hyper-media system of the present embodiment includes a common processing unit 10 for conducting management and processing of common attributes in a hyper-media document, a plurality of application processing units 20 for conducting management and processing of inherent attributes in a hyper-media document, a procedure management unit 30 for allocating various kinds of procedures for a hyper-media document to the common processing unit 10 and the application processing units 20 and managing the procedures, and a storage device 40 for storing a hyper-media document.

The common processing unit 10, which is implemented by a CPU and an application program controlling the CPU, conducts management and necessary processing of common attributes in the use of a hyper-media document by various application processing units 20. As illustrated in the figure, the common processing unit 10 includes a node management unit 11 for managing a node linked to a hyper-media document, a link management unit 12 for managing a link between nodes described in a hyper-media document, a navigation management executing unit 13 for executing and managing navigation processing, a context management unit 14 for managing a context indicative of a semantic attribute accompanying a link between nodes, and a visitor management controlling unit 15 for controlling and managing visitor information (node visit information) at the execution of navigation processing.

The application processing unit 20, which is implemented by a CPU and an application program controlling the CPU, conducts necessary processing including addition of inherent attributes in the application processing unit 20 when using a hyper-media document. As illustrated in the figure, the application processing unit 20 includes the same function means as those of the common processing unit 10. More specifically, the application processing unit 20 includes a node management unit 21, a link management unit 22, a navigation management executing unit 23, a context management unit 24 and a visitor management controlling unit 25. As described in the foregoing, while each function means in the common processing unit 10 is a means for conducting standard processing with respect to a hyper-media document, each function means in each application processing unit 20 is a means for executing processing inherent to the application processing unit 20 with respect to the hyper-media document.

The respective function means 11 to 15 of the common processing unit 10 and the respective function means 21 to 25 of the application processing unit 20 have module architecture made up of a plurality of partial procedures. Each function means enables a call of a procedure of other function means by using a procedure name.

The procedure management unit 30, which is implemented by a program-controlled CPU or the like, includes a procedure allocation table 32 provided corresponding to each of the function means 11 to 15 of the common processing unit 10, a pair table 33 provided corresponding to each of the function means 21 to 25 of each application processing unit 20, and a procedure allocation table managing unit 31 for managing these tables 32 and 33. The pair table 33 is a pair of a procedure allocation table 331 corresponding to each application processing unit 20 and an inherent data management table 332. As the procedure allocation table, therefore, there exist the table 32 corresponding to the common processing unit 10 and the table 331 corresponding to the application processing unit 20. With respect to each of the various procedures, the procedure allocation table 32 has an entry including a procedure name given corresponding to each procedure in advance and an address at which the procedure resides (hereinafter referred to as a procedure address). The procedure allocation table 331 corresponding to a predetermined function means of the application processing unit 20 is derivatively created from the procedure allocation table 32 corresponding to the relevant function means of the common processing unit 10.

The inherent data management table 332 manages data necessary for the execution of a procedure. Correspondence between the procedure allocation table 331 and the inherent data management table 332 in the pair table 33 is managed by the procedure allocation table managing unit 31.

The procedure management unit 30 hierarchically manages a group of the procedure allocation tables 331 derivatively created from the procedure allocation table 32 and determines by the procedure allocation table managing unit 31 whether a procedure allocation table 331 below a predetermined hierarchy is of the same kind as that of the procedure allocation table 32 which is the root of the hierarchy.

The procedure management unit 30 is implemented by the control of the CPU by the application program implementing the common processing unit 10 and the application program implementing the application processing unit 20 which share the functions of the above-described procedure management unit 30.

The storage device 40, which is implemented by an internal storage device such as a RAM and an external storage device such as a magnetic disk device, stores a hyper-media document which is to be a navigation processing object.

Figure 2:
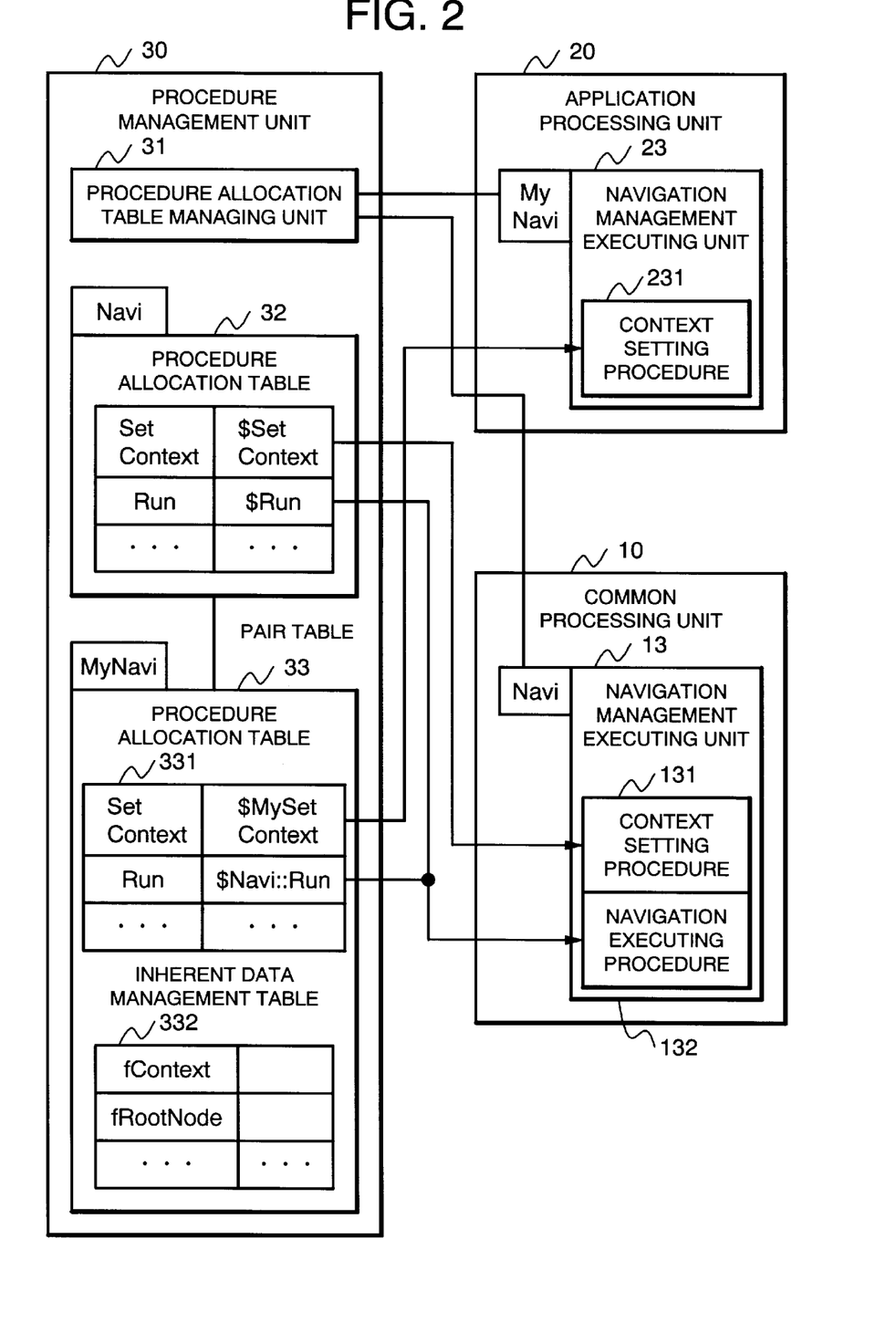
FIG. 2 is a block diagram showing structure of a navigation management executing unit of a common processing unit and a navigation management executing unit of an application processing unit, and arrangement of tables in a procedure allocation table managing unit corresponding to these function means.

FIG. 2 is a block diagram showing structure of the navigation management executing unit 13 of the common processing unit 10 and the navigation management executing unit 23 of the application processing unit 20, and arrangement of the tables in the procedure management unit 30 corresponding to these function means according to the present embodiment.

Figure 3:
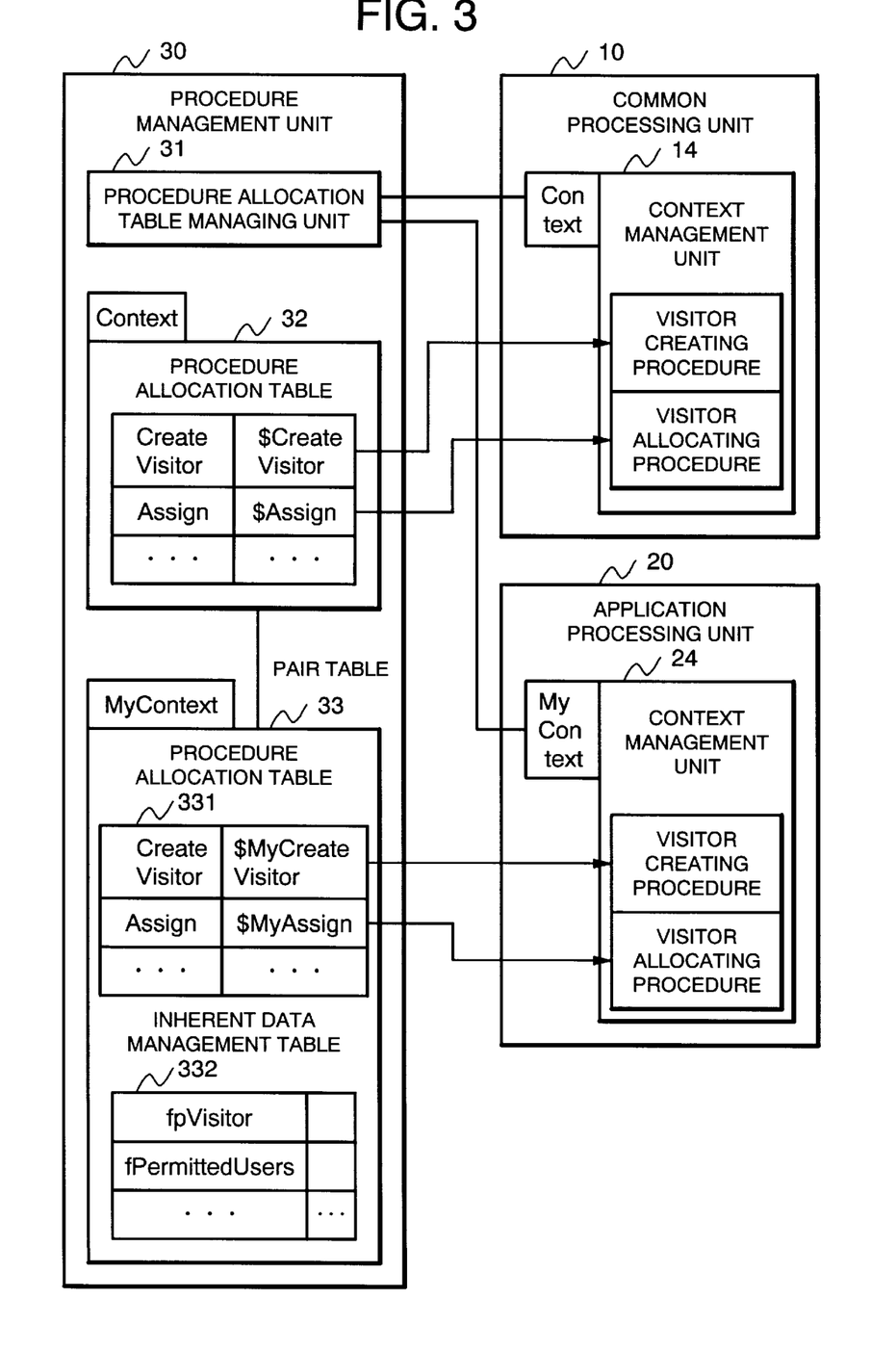
FIG. 3 is a block diagram showing structure of a context management unit of the common processing unit and a context management unit of the application processing unit, and arrangement of tables in a procedure management unit corresponding to these function means.

FIG. 3 is a block diagram showing structure of the context management unit 14 of the common processing unit 10 and the context management unit 24 of the application processing unit 20, and arrangement of the tables in the procedure management unit 30 corresponding to these function means according to the present embodiment.

Figure 4:
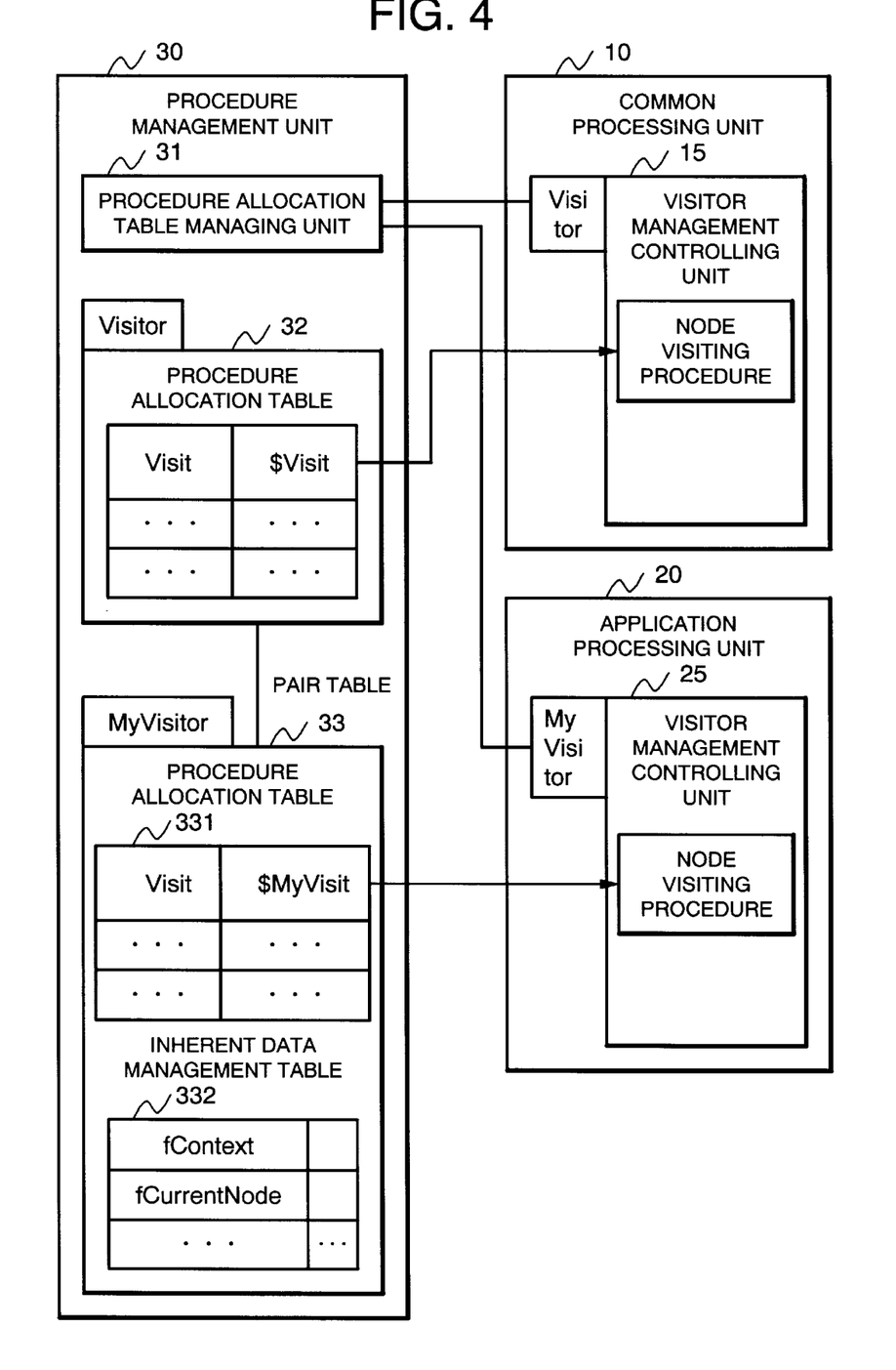
FIG. 4 is a block diagram showing structure of a visitor management controlling unit of the common processing unit and a visitor management controlling unit of the application processing unit, and arrangement of tables in the procedure management unit corresponding to these function means.

FIG. 4 is a block diagram showing structure of the visitor management controlling unit 15 of the common processing unit 10 and the visitor management controlling unit 25 of the application processing unit 20, and arrangement of the tables in the procedure management unit 30 corresponding to these function means according to the present embodiment.

As illustrated in FIGS. 2 to 4, registered in the procedure management unit 30 is the procedure allocation table 331 which corresponds to each of the function means 21 to 25 of the application processing unit 20 and which is derivatively created from the procedure allocation table 32 corresponding to each of the function means 11 to 15 of the common processing unit 10. In other words, the procedure allocation table 331 for the function means of the application processing unit 20 is created to include at least all the entries having procedure names of the procedure allocation table 32 for each of the function means in the common processing unit 10 corresponding to the function means of the application processing unit 20 in question. More specifically, for example, the procedure allocation table 331 for the navigation management executing unit 23 of the application processing unit 20 is derivatively created from the procedure allocation table 32 of the navigation management executing unit 13 in the common procedure unit 10 and includes all the entries having procedure names in the procedure allocation table 32 of the navigation management executing unit 13 in question. The procedure allocation table 331 for the node management unit 21 of the application processing unit 20 similarly includes all the entries having procedure names in the procedure allocation table 32 for the node management unit 11 of the common processing unit 10. In addition, the procedure allocation table 331 for the link management unit 22 of the application processing unit 20 includes all the entries having procedure names in the procedure allocation table for the link management unit 12 of the common processing unit 10.

Next, flow of the procedure by the respective function means of the application processing unit 20 will be described with reference to FIG. 2.

With respect to the procedure allocation table 32 and the pair table 33 stored in the procedure management unit 30, it is assumed as illustrated in FIG. 2 that the name of the procedure allocation table 32 corresponding to the navigation management executing unit 13 of the common processing unit 10 is "Navi" and the name of the pair table 33 corresponding to the navigation management executing unit 23 of a given application processing unit 20 is "My Navi". It is further assumed that the procedure name of the context setting procedure, which is one of the partial procedures of the navigation management executing units 13 and 23, is "Set Context" and the procedure name of the navigation executing procedure, which is the other one of the partial procedures of the navigation management executing unit 13, is "Run".

In this case, an address of an execution code of the context setting procedure to be executed during the processing by the application processing unit 20 in question is a procedure address "$My Set Context" corresponding to the procedure name "Set Context" in the procedure allocation table 331 of the pair table 33 identified as My Navi, which is an address of the context setting procedure 231 of the navigation management executing unit 23. When the instruction "execution of context setting procedure" is given in the application processing unit 20 in question, therefore, the context setting procedure by the navigation management executing unit 23, that is, the context setting procedure inherent to the application processing unit 20 in question, will be conducted.

On the other hand, an address of an execution code of the navigation executing procedure to be executed during the processing by the application processing unit 20 is a procedure address "$Navi::Run" corresponding to the procedure name "Run" in the procedure allocation table 331 of the pair table 33 identified as My Navi, which is an address of the navigation executing procedure 132 as a partial procedure by the navigation management executing unit 13 of the common processing unit 10. When the instruction "execution of navigation executing procedure" is given in the application processing unit 20 in question, the navigation executing procedure will be executed by the navigation management executing unit 13 of the common processing unit 10.

As described in the foregoing, using a partial procedure of the function means of the common processing unit 10 with respect to a predetermined procedure (navigation executing procedure in the above-described example) and using a partial procedure inherent to the application processing unit 20 with respect to the remaining procedures (context setting procedure in the above-described example) enables execution of a procedure inherent to the functional means of each application processing unit 20 as necessary while using, as a common procedure among the plurality of application processing units 20, a standard procedure by the function means of the common processing unit 10. As a result, it is possible to use the same hyper-media document by the plurality of application processing units 20 in different modes.

Operation of thus structured hyper-media system of the present embodiment will be described in the following.

Figure 5:
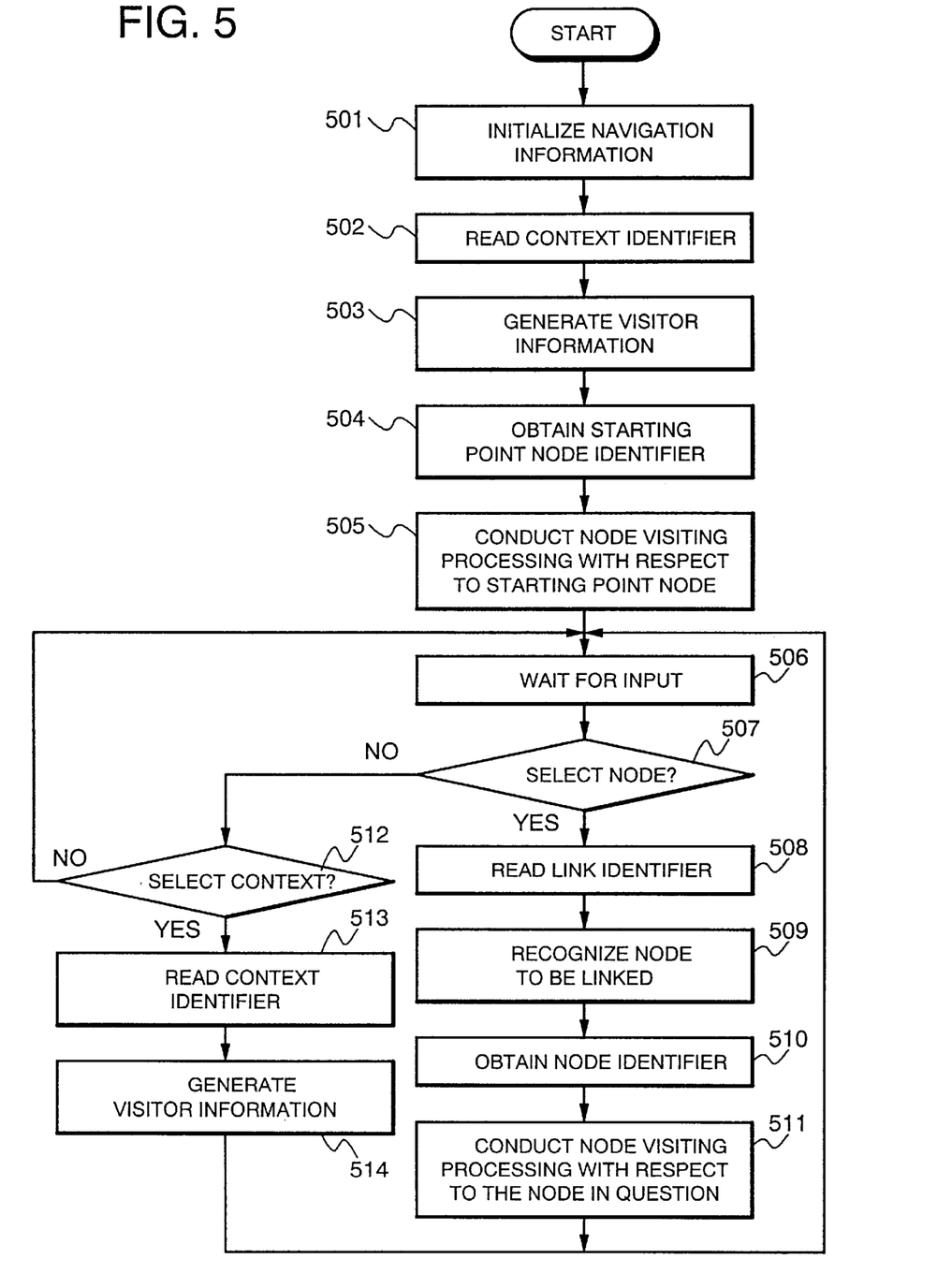
FIG. 5 is a flow chart showing navigation processing of the present embodiment.
Figure 6:
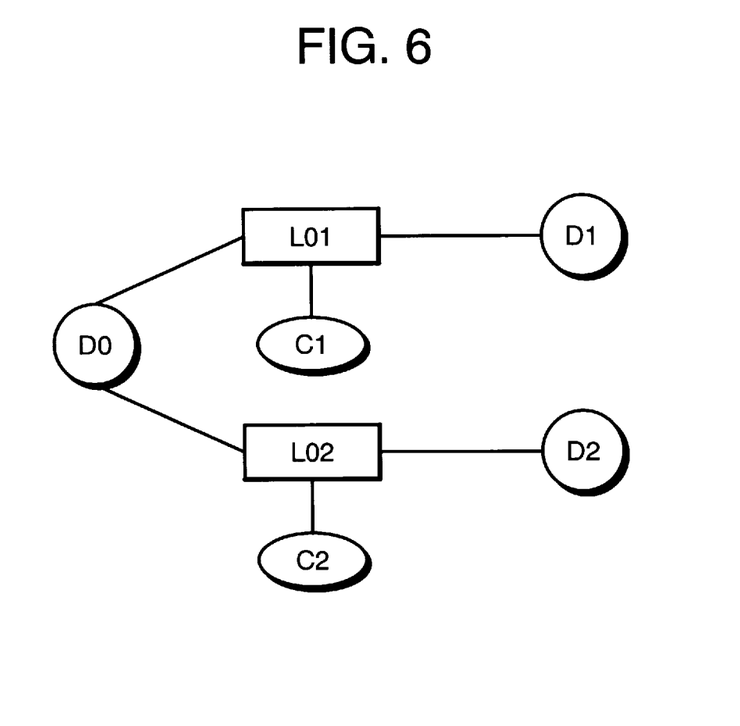
FIG. 6 is a schematic diagram for use in explaining mode of using context.
Figure 7:
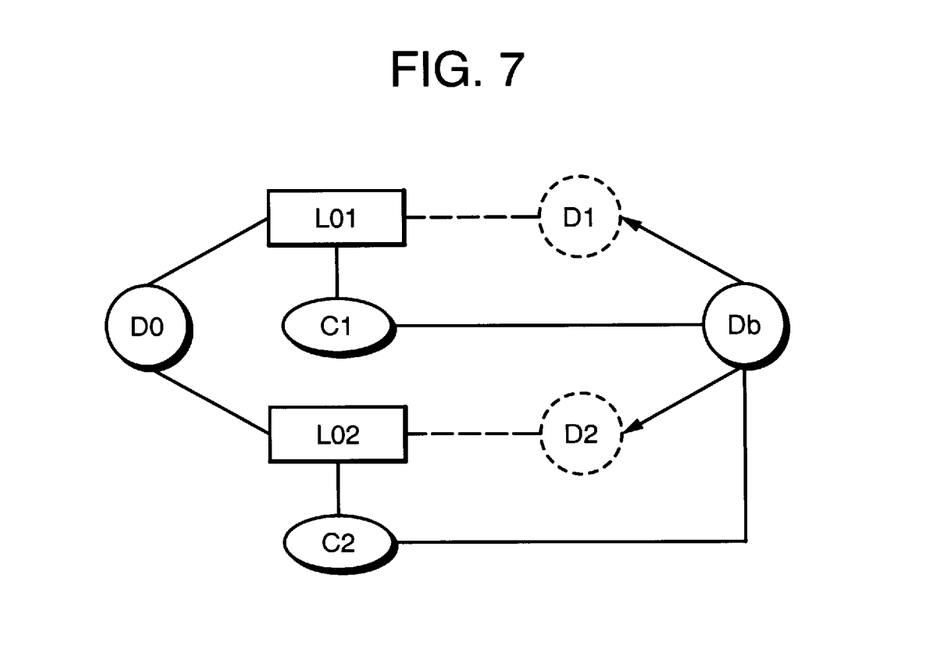
FIG. 7 is a schematic diagram for use in explaining other mode of using context.

FIG. 5 is a flow chart showing navigation processing according to the present embodiment, that is, the processing controlled by the navigation executing procedure, which is a partial procedure of the navigation execution management unit 13. FIGS. 6 and 7 are schematic diagrams for use in explaining mode of using a context.

Reception and transfer of control between the respective function means in the following operation is controlled and managed by the procedure allocation table managing unit 31 of the procedure management unit 30. Mode of the control and management will not be referred to in the following description.

When a hyper-media document in the storage device 40 is to be read by a given application processing unit 20 (assuming the application processing unit 20a in this case) to conduct navigation processing, the navigation management executing unit 23 of the application processing unit 20a is started. Here, "the navigation management executing unit 23 of the application processing unit 20a is started" implies that in a case where a procedure inherent to the navigation management executing unit 23 in question exists, the procedure (context setting procedure in FIG. 2, for example) is started and in a case where no procedure inherent to the navigation management executing unit 23 in question exists, relevant procedure (navigation executing procedure in FIG. 2, for example) in the navigation management executing unit 13 of the common processing unit 10 is started (hereinafter, the same expression implies similarly.)

First, the navigation management executing unit 23 of the application processing unit 20a initializes the inherent data management table (navigation information) 332 included in the corresponding pair table 33 of the procedure management unit 30 (Step 501). In this initialization, information such as an identifier for use in referring to data obtained from a read hyper-media document is stored in each entry of the inherent data management table 332 in question. Stored in the entry "fContext" in the inherent data management table 332 illustrated in FIG. 2 is a context identifier corresponding to context data described in the hyper-media document in question, while stored in the entry "fRoot Node" is a node identifier corresponding to a node which is a starting point of the hyper-media document in question.

As well as the foregoing processing, the context management unit 24 of the application processing unit 20 specified by each context data described in the hyper-media document in question generates an inherent data management table 332 based on each context data in question.

Next, since as shown in FIG. 2, navigation executing procedure by the navigation management executing unit 13 of the common processing unit 10 is always conducted as the navigation executing procedure and there exists no navigation executing procedure inherent to the navigation management executing unit 23 of the application processing unit 20, the navigation executing procedure by the navigation management executing unit 13 of the common processing 10 reads out a context identifier of the entry "fContext" of the inherent data management table (navigation information) 332 corresponding to the navigation management executing unit 23 of the application processing unit 20a (Step 502). Here, context identifier denotes an identifier designating the inherent date management table (context information) 332 corresponding to the application processing unit 20b.

Next, the navigation executing procedure transfers control to the context management unit 24 of the application processing unit 20b. At this time, as well as the control, the context identifier read at Step 502 is transferred.

The visitor creating procedure (procedure with the procedure name "Create Visitor" in FIG. 3) in the context management unit 24 of the application processing unit 20b creates the inherent data management table (visitor information) 332 of the pair table 33 corresponding to the visitor management controlling unit 25 of the application processing unit 20b based on the received context identifier (Step 503). Then, the visitor creating procedure returns a visitor identifier indicative of the generated visitor information to the navigation executing procedure. Visitor information includes a context identifier (corresponding to the information of the entry "fContext" in FIG. 4), current node information (corresponding to the information of the entry "fCurrent Node" in FIG. 4) indicative of a node identifier of a node (current node) as a navigation processing object, and history information indicative of a node having been visited in the navigation processing in question and the like.

The navigation executing procedure obtains a node identifier of a current node (at this time point, a starting point node specified by a node identifier stored in the entry "fRoot Node" in the above-described navigation information) indicated by the current node information "fCurrent Node" in the visitor information specified by the visitor identifier received from the visitor creating procedure (Step 504). Then, the navigation executing procedure transfers control to the node management unit 21 corresponding to the node identifier of the current node, with the visitor identifier in question and a context identifier in the navigation information as arguments.

The acceptance procedure Accept of the node management unit 21 transfers control to the node visiting procedure (the procedure with the procedure name "Visit" in FIG. 4) of the visitor management controlling unit 25 (the visitor management controlling unit of the application processing unit 20b) specified by the received visitor identifier.

The node visiting procedure of the visitor management controlling unit 25 taking over the control controls execution of the node visiting processing (execution of the processing implemented by the visitor allocating procedure of the context management unit 24 or the like) for the current node (Step 505).

In the node visiting processing, processing by a conventional hyper-media system is conducted such as processing on a data type basis, updating of "a node identifier of a current node (current node information)" and output of node data (see FIG. 9, Steps 906, 907 and 908). In addition, by calling the node visiting procedure Visit during this node visiting processing, a node to be visited next will be taught through the execution of the visitor allocating procedure for the context management unit 24 (the procedure with the procedure name "Assign" in FIG. 3) specified by the context identifier in question. More specifically, such control is possible as to teach a node to be visited next only when a user whose name is listed in fPermitted Users in the inherent data management table 332 (in FIG. 3) operate.

Upon completion of the foregoing node visiting processing, control returns to the navigation executing procedure. The navigation executing procedure waits for input of user's instructions (Step 506). User's instructions are input by such operation as mouse click.

Upon input of an instruction by the user, the navigation executing procedure first determines whether the input instruction is to select a node or not (Step 507).

When the determination is made that the input user's instruction is to select a node, the navigation executing procedure issues a request to the link management unit 22 to read a link identifier indicative of link contents (information indicative of a link matching a kind of context information) (Step 508). Then, the navigation executing procedure recognizes a node to be linked by a link specified by the read link identifier (Step 509) to obtain a node identifier of the node in question (Step 510).

The navigation executing procedure then transfers control to the visitor management controlling unit 25 through the node management unit 21 corresponding to the obtained node identifier. The node visiting procedure of the visitor management controlling unit 25 updates current node information in the visitor information in question based on the node identifier in question and then controls execution of the node visiting processing with respect to a node (current node) specified by a node identifier indicated by the current node information in question (Step 511). Thereafter, the node visiting procedure returns control to the input waiting state of the navigation executing procedure (Step 506).

On the other hand, when the determination is made that the input user's instruction is not to select a node, the navigation executing procedure further determines whether the input user's instruction is to select a context or not (Step 512).

When the determination is made that the input user's instruction is to select a context, the navigation executing procedure reads a context identifier corresponding to the context specified by the user (Step 513).

Next, the navigation executing procedure transfers control to the new context management unit 24. The visitor creating procedure in the context management unit 24 taking over the control generates new visitor information based on the received context identifier (Step 514). Then, after returning a visitor identifier indicative of the generated visitor information, the visitor creating procedure returns control to the input waiting state of Step 506.

When the determination is made that the input user's instruction is not to select a context at Step 512, the navigation executing procedure returns control to the input waiting state without executing any processing (Step 506).

According to the foregoing navigation processing, calling of the context management units 24 and the visitor management controlling units 25 of the plurality of application processing units 20 enables navigation processing by the same navigation executing procedure to have different operations. As a result, different navigation processing is possible only by replacing the procedure allocation tables 331 in the procedure management unit 30 corresponding to the context management unit 24 and the visitor management controlling unit 25 in accordance with the respective application processing units 20.

The navigation executing procedure started in common with respect to all the application processing units 20 determines navigation operation (contents of the node visiting processing at Steps 505 and 511 in FIG. 5) by a node identifier obtained from a predetermined node management unit 21 based on user's instructions and a context identifier obtained from a predetermined context management unit 24 based on user's instructions. It is therefore possible to control a fixed semantic attribute conventionally accompanying a link by a context.

Contents of the control based on context data described in a hyper-media document will be described with reference to FIGS. 6 and 7.

When such a hyper-media document in which context data C1 and C2 are attached to links L01 and L02 is read as is shown in FIGS. 6 and 7, navigation processing by a navigation executing procedure is conducted according to a kind of the context data C1 and C2.

If the context data C1 and C2 are of the same kind in the example shown in FIG. 6, one visitor identifier related to the context data is created. Furthermore, nodes D1 and D2 as objects of node visiting processing by the context data C1 and C2 are specified based on the created visitor identifier. As a result of the designation of the nodes D1 and D2, the current node is updated from the node D0 to the nodes D1 and D2, while the navigation executing procedure is notified of the updating of the current node. Upon receiving the notification of the current node updating, the navigation executing procedure conducts control, for example, for displaying node data of a right node (current node) on a screen being displayed.

In the example shown in FIG. 7, the context data C1 and C2 create virtual nodes D1 and D2 from the node Db, respectively, while notifying the visitor management controlling unit 25 of the creation of the virtual nodes. Since the virtual nodes D1 and D2 are created from the individual information of the context data C1 and C2 and the node data of the node Db, navigation processing will be possible for dynamically processing node data of Db, for example, by context data.

As described in the foregoing, through introduction of the concept of context implemented by context data, context information and a context identifier, the present invention enables the operation at the execution of navigation processing to be changed by switching context data described in a hyper-media document and enables the same hyper-media document to be used by a plurality of application processing units in different modes, thereby improving facility of the system.

Since the respective function means of the respective application processing units and the common processing unit have a hierarchical architecture and context management means and visitor management control means are provided as well as node management means, link management means and navigation management executing means, the present invention has a further effect of executing navigation processing coping with flexible processing such as processing inherent to each application processing unit and use of processing contents of one application processing unit by other application processing unit.

Moreover, the above-described effect enables alteration of operation in navigation processing without changing a program code for implementing an application processing unit or editing a hyper-media document, thereby reducing labor required for altering operation in navigation processing.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed:

1. A hyper-media system which executes navigation processing for tracing a link between nodes in a hyper-media document, comprising:

storage means for storing a hyper-media document;

a plurality of application processing means for conducting inherent processing by using said hyper-media document;

common processing means for conducting management and processing of common attributes in said hyper-media document; and procedure management means for allocating various kinds of procedures for said hyper-media document to said common processing means and said application processing means and managing the procedures;

wherein each of said plurality of application processing means and said common processing means include node management means for managing a node linked to said hyper-media document, link management means for managing a link between said nodes described in said hyper-media document, navigation management executing means for executing and managing navigation processing, context management means for managing a context indicative of a semantic attribute accompanying the link between said nodes, and visitor management controlling means for controlling and managing visitor information at the execution of navigation processing, and said procedure management means including a first procedure allocation table for managing allocation of the procedure by said common processing means, a pair table comprised of a second procedure allocation table for managing allocation of the procedure by said application processing means and an inherent data management table for managing data inherent to said application processing means, and a procedure allocation table managing means for managing said first procedure allocation table and said pair table, and controlling reception and transfer of control between said common processing means and said application processing means.

2. The hyper-media system as set forth in claim 1, wherein said procedure management means creates said second procedure allocation table included in said pair table derivatively from said first procedure allocation table.

3. The hyper-media system as set forth in claim 1, wherein said first and second procedure allocation tables provided in said procedure management means have an entry including a procedure name set in advance for a given procedure and an address at which the procedure resides, said second procedure allocation table at least including entries having the same procedure names as those of all the entries set in said first procedure allocation table.

4. The hyper-media system as set forth in claim 1, wherein said procedure management means hierarchically manages said first procedure allocation table and said second procedure allocation table included in said pair table.

5. The hyper-media system as set forth in claim 1, wherein among the function means provided in said application processing means and said common processing means, said navigation management executing means includes a context setting procedure, said context management means includes a visitor creating procedure and a visitor allocating procedure, and said visitor management controlling means includes a node visiting procedure.

6. The hyper-media system as set forth in claim 1, wherein said navigation management executing means of said common means has a navigation executing procedure for conducting navigation processing for dynamically processing node data based on context data.

7. The hyper-media system as set forth in claim 1, wherein among the means provided in said application processing means and said common processing means, said navigation management executing means includes a context setting procedure, said context management means includes a visitor creating procedure and a visitor allocating procedure, and said visitor management controlling means includes a node visiting procedure, and said navigation management executing means of said common means has a navigation executing procedure for conducting navigation processing for dynamically processing node data based on context data.

8. The hyper-media system as set forth in claim 1, wherein said procedure management means creates said second procedure allocation table included in said pair table derivatively from said first procedure allocation table, among the means provided in said application processing means and said common processing means, said navigation management executing means includes a context setting procedure, said context management means includes a visitor creating procedure and a visitor allocating procedure, and said visitor management controlling means includes a node visiting procedure, and said navigation management executing means of said common means has a navigation executing procedure for conducting navigation processing for dynamically processing node data based on context data.

9. The hyper-media system as set forth in claim 1, wherein said first and second procedure allocation tables provided in said procedure management means have an entry including a procedure name set in advance for a given procedure and an address at which the procedure resides, said second procedure allocation table at least including entries having the same procedure names as those of all the entries set in said first procedure allocation table, among the means provided in said application processing means and said common processing means, said navigation management executing means includes a context setting procedure, said context management means includes a visitor creating procedure and a visitor allocating procedure, and said visitor management controlling means includes a node visiting procedure, and said navigation management executing means of said common means has a navigation executing procedure for conducting navigation processing for dynamically processing node data based on context data.

* * * * *